Jan. 24, 1939.   B. G. CARLSON   2,144,614
AIRCRAFT AUTOMATIC PILOT
Original Filed Dec. 11, 1935   3 Sheets-Sheet 1
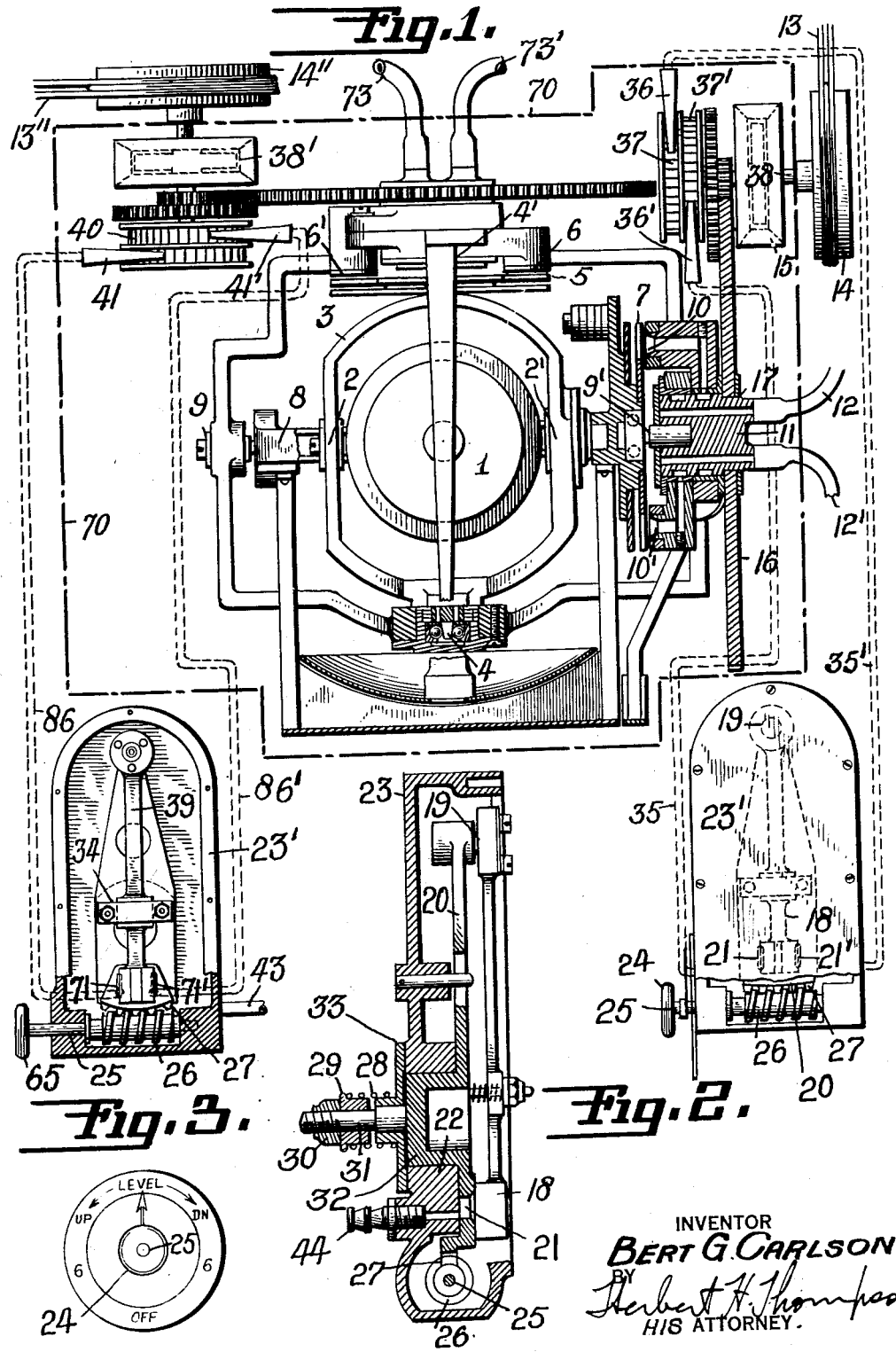
INVENTOR
BERT G. CARLSON
BY
Herbert H. Thompson
HIS ATTORNEY.

Jan. 24, 1939. B. G. CARLSON 2,144,614
AIRCRAFT AUTOMATIC PILOT
Original Filed Dec. 11, 1935 3 Sheets-Sheet 2
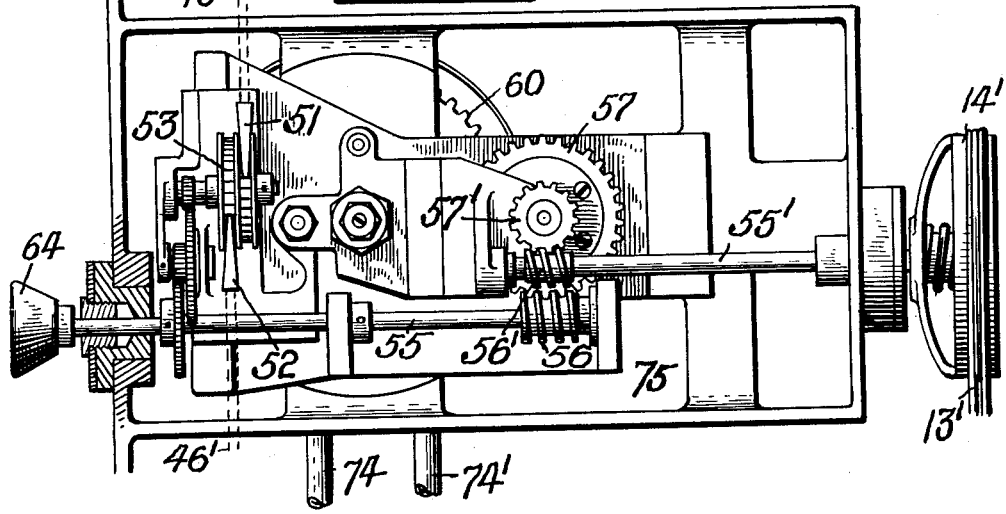
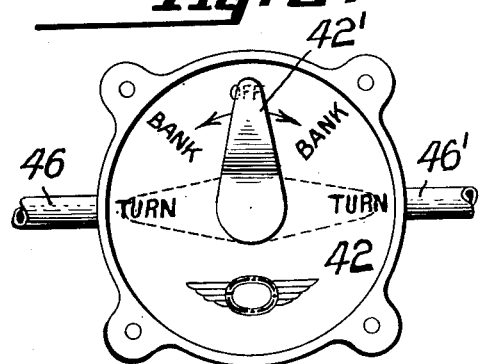
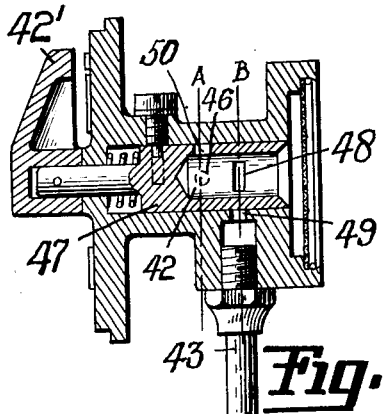
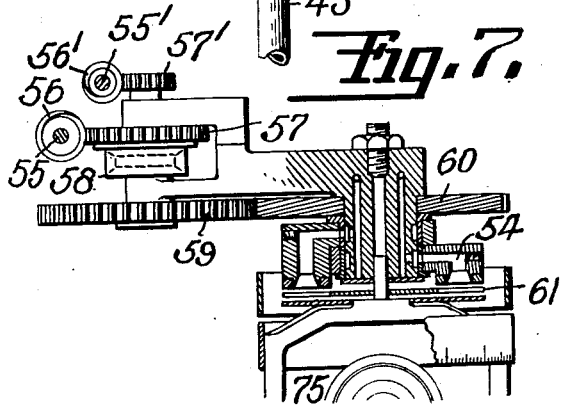
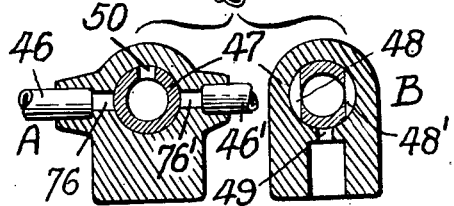
INVENTOR
BERT G. CARLSON
BY Herbert H. Thompson
HIS ATTORNEY

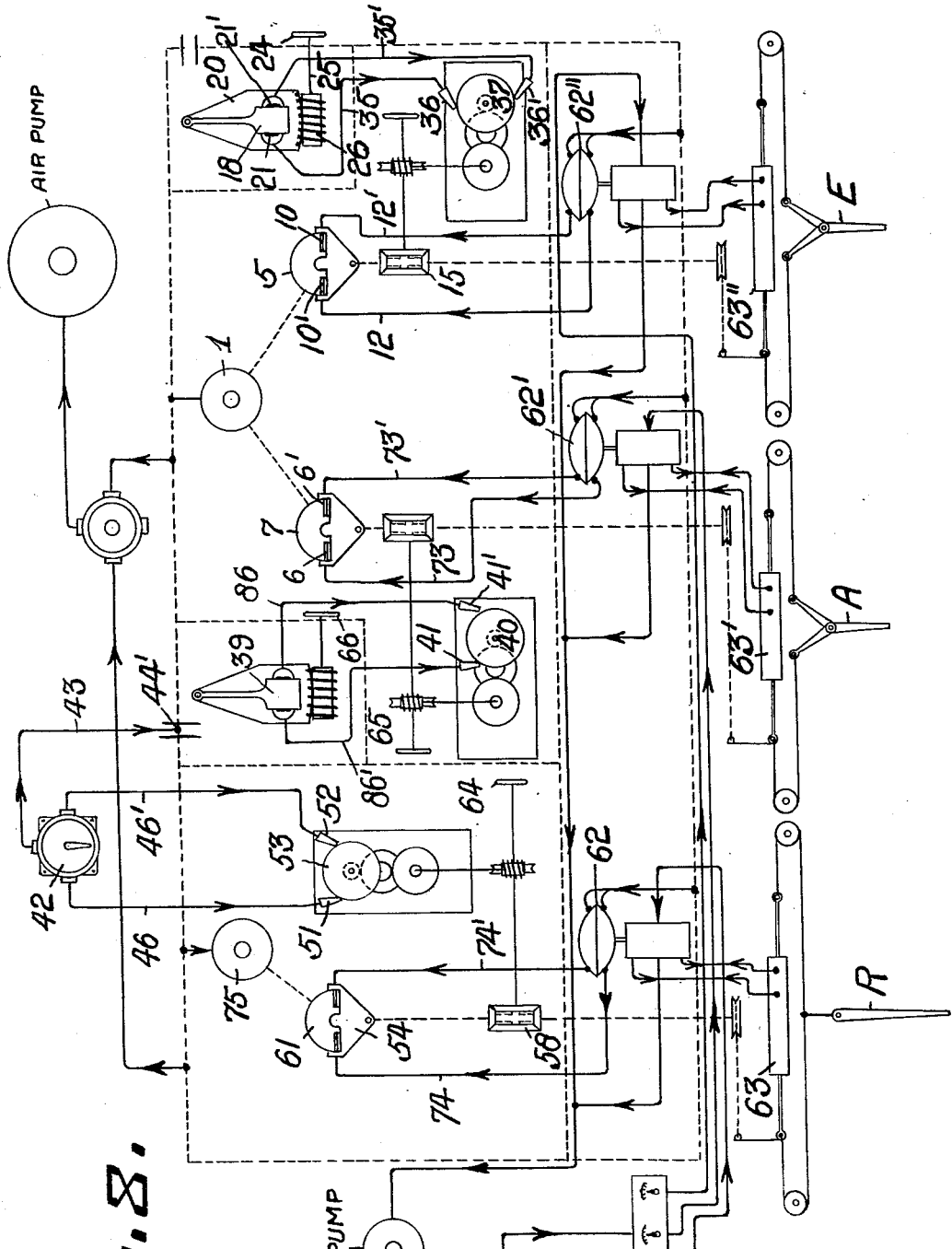

Patented Jan. 24, 1939

2,144,614

UNITED STATES PATENT OFFICE 2,144,614

AIRCRAFT AUTOMATIC PILOT

Bert G. Carlson, Freeport, N. Y., assignor to Sperry Gyroscope Company, Inc., Brooklyn, N. Y., a corporation of New York Application December 11, 1935, Serial No. 53,857
Renewed October 22, 1937

15 Claims. (Cl. 244—78)

This invention relates to automatic pilots for aircraft. While it is essentially an improvement upon the type of automatic pilot shown in the prior joint patent of applicant, Elmer A. Sperry, Jr., and Mortimer F. Bates, No. 1,992,970, dated March 5, 1935, many features thereof are applicable to other types of automatic pilots.

One object of the invention is to provide a self-leveling device which will prevent the airplane from tending to climb or descend in case the center of gravity of the aircraft shifts during flight.

Another object of the invention is to provide means for automatically banking the craft during a turn at the correct banking angle, and also to return automatically to level flight at the completion of the turn.

Referring to the drawings, showing one form my invention may assume,

Fig. 1 is a plan view, partly in section, of the gyro vertical unit of an automatic pilot with the automatic banking and self-leveling attachments shown in elevation, and the latter also being turned through 90° from its correct position with respect to the gyroscope and aircraft.

Fig. 2 is a vertical section through one of the pendulum controls.

Fig. 3 is a detail of the operating knob for the level control.

Fig. 4 is a plan view, partly in section, of the directional gyro unit.

Fig. 5 is a face view of the control knob for the automatic banking attachment.

Fig. 6 is a vertical section of the same.

Fig. 7 is a side view, partly in section, of the directional gyro unit.

Fig. 8 is a diagrammatic view illustrating the several parts of a complete aircraft automatic pilot provided with my improvements.

Fig. 9 is two vertical sections taken on lines A and B of Fig. 6.

When an aircraft is being flown under the control of a gyroscopic horizon or other device which maintains a true level plane, it has a tendency to climb or descend slightly in case the center of gravity of the aircraft is displaced after initial adjustments. This is due to the fact that the airplane under such circumstances will repeatedly depart from level flight in the same direction. According to my present invention, I correct this defect by means of an auxiliary pendulum which changes the relation between the gyro vertical and the craft when the plane tends to become inclined in one direction or the other due to shifts in the center of gravity, for instance, and by this means level flight is maintained. Similarly, for automatic banking I employ an auxiliary pendulum responsive to lateral acceleration forces for changing the relation between the gyro vertical and the aircraft to bring about the correct amount of bank.

In Fig. 1, a gyro vertical is illustrated, of a type similar to that in the aforementioned patent. The gyro rotor is mounted with a vertical spinning axis within the casing 1, the casing, in turn, being pivoted on transverse trunnions 2, 2' within gimbal ring 3 which, in turn, is mounted for oscillation about the fore and aft trunnions 4 and 4' on the aircraft. The control or pick off for lateral stability is secured from a control disc 5 secured to the trunnion 4', which acts as a cut-off for a pair of differential air nozzle members 6, 6' pivotally mounted similarly to the corresponding nozzles 10 and 10' for pitching hereinafter described. Similarly, the control against pitching is secured from a cut-off disc 7 secured to a bail or loop 8 which is pivoted on a transverse axis 9 normally in line with the axis 2—2' of the gyroscope, the bail being connected to the gyro element to swing fore and aft with the relative fore and aft movements of the gyroscope. The air nozzles 10 and 10' are pivotally mounted on a bearing block 11, coaxial with the pivots 9 and 9' of the bail, and air is either supplied to the nozzles or withdrawn therefrom through pipes 12 and 12', all substantially as shown in the aforesaid prior patent. The follow-up from the elevators is shown as coming in through cables 13 to drum 14, which operates, through a differential 15, a large gear 16 secured to a sleeve 17 which carries the nozzle members.

Preferably I bring in through the same differential my self-leveling control which operates to shift the relation between the gyroscope and the pick off device. This is shown as comprising a pendulum 18 pivoted at 19 on adjustable member 20. The pendulum is mounted to swing only in the fore and aft plane and is shown as having a straight edge thereof which partially overlies rectangular air ports 21 and 21' lying behind the same. Said ports are shown as formed in the member 20, which in turn is adjustably mounted in a hub 22 formed in the casing 23 of which the cover 23' is removed in Fig. 2. When the cover is on, the box is air tight except for ports 21 and 21' connected to the atmosphere through pipe coupling 44. The position of said nozzles may be readily adjusted by turning a knob 24 on an extension of the shaft 25 which carries a worm 26 meshing with a worm sector 27 formed on the lower end of said member 20. The member 20 is shown as held in place by a compression spring 28 which bears against a collared sleeve 29, held by a nut 30 on a stub shaft 31 projecting from the back of a central boss 32 on member 20, the inner end of said spring bearing against a guard washer 33 which rests on the casing itself to form an air tight joint. The pendulum is guided in its movements by a strap 34 which prevents oscillations in any plane except fore and aft.

Air is normally sucked equally through ports 21 and 21', passing through pipes 35 and 35' to a pair of small nozzles 36 and 36' which direct streams of air against oppositely acting, small turbine wheels 37 and 37'. Said nozzles are within an air tight casing 70 surrounding the gyro vertical, from which air is continuously pumped. Said wheels are mounted on a common shaft 38 and drive through large reduction gearing the second arm of the differential 15. If, therefore, the level of the airplane changes, the pendulum will cause a greater amount of air to flow through one port 21 than the other 21', for instance, thus driving the turbines in the proper direction to shift the position of the air ports 10 and 10' with respect to the cut-off disc 7 on the gyro. This will cause the inclination of the airplane to change until the position of equilibrium has been reached with respect to the pendulum. In case the aviator wishes to climb or dive, all that he need do is turn the knob 24 and the airplane will climb or dive to the exact angle that he sets the knob for.

The banking pendulum 39 operates similarly around the fore and aft axis and may be of similar construction except that it is mounted on the airplane to swing transversely instead of fore and aft. It is shown as operating similar turbine wheels 40 from nozzles 41 and 41' through pipes 86, 86' to change the relation between the gyroscope and the control pick-off about the fore and aft axis. Normally, however, the banking pendulum is rendered inoperative by means of a valve 42 which is left closed or off except when the airplane is turning and which is placed in the supply pipe 43 connected to coupling 44 on the casing 23' of this pendulum. In this position no air is supplied to the banking pendulum controls. Said valve 42 is shown as comprising a hollow cylinder 47 open at one end to the atmosphere and rotatable by means of knob 42'. Besides the central or "off" position, it has two positions on each side, the first position being to bank the plane without causing automatic turning of the rudder, and the second position on each side to cause a right or left turn and bank at the proper angle. To this end, cylinder 47 is shown as provided with opposite elongated openings 48 and 48' through the wall thereof, one of which is brought into register with the port 49 leading to pipe 43 when the valve is turned through about 45° in either direction, thus energizing the pendulum control 39 to supply the automatic banking control at the gyroscope. An additional smaller hole 50 is provided through the wall of the cylinder which, when the valve is turned through 90° in either direction, brings said opening into register with one of ports 76, 76' leading to pipe 46 or 46'. Said pipes lead to similar nozzles 51 and 52 on the turbine 53 at the directional gyroscope 75 so as to slowly revolve the air pick-off member through the rotation of shaft 55, worm 56, worm wheel 57, differential 58 and gear 59 which meshes with the large gear 60 at the top of the directional gyroscope connected to member 54. The directional gyroscope is provided with a cut-off disc 61 similar to the cut-off discs on the gyro vertical.

A knob 65, similar to knob 24 on the pitch pendulum 18, is also provided for the bank pendulum, the turning of this knob operating to displace the relative position of the pick-off ports 71 and 71' with respect to the pendulum by means of the worm 26' and worm sector 27'. This pendulum may therefore not only be used to cause the plane to fly exactly level, but may also be used to cause one or the other wing to dip. As is well known in the art, this will also result in a turn of the craft even if the rudder is kept in alignment at that time, so that turns may be caused in this manner, if desired, at the correct banking angle. If, however, the knob 65 is turned to recentralize the ports with respect to the pendulum, the airplane will be brought back to its original course by the directional gyro unless, in the meantime, the course change handle 64 or knob 42' has been moved to keep the plane on the new course, or the directional gyro was locked during the turn.

The several pick-offs from the directional gyroscope and gyro vertical control, respectively, the steering rudder R, ailerons A and the elevator E through relay valves 62, 62' and 62'' and hydraulic servo-motors 63, 63' and 63'', as described in the aforesaid patent, the direction gyro pick-off being connected to relay 62 through pipes 74 and 74', the aileron control being connected to relay 62' through pipes 73 and 73', and the elevator control connected to relay 62'' through pipes 12 and 12'. Follow back connections from the servo-motors to the gyro controls are also provided in each instance. Thus, flexible wires 13' connect servo-motor 63 with a pulley 14' on the directional gyroscope, which turns one arm of differential 58 through shaft 55', worm 56' and worm wheel 57', and wires 13'' connect servo-motor 63' with pulley 14' at the aileron control 6—6', while wires 13 connect servo-motor 63'' with pulley 14 at the elevator control 10—10'.

Turning may also be effected through the knob 64 operating through the differential 58 to displace the pick-off on the directional gyroscope, and when this knob is operated if automatic banking is desired, the knob 42' should be turned to the bank position but not to the turn position.

From the foregoing description the operation of the invention should be readily apparent. Normally, the aircraft flies entirely under control of the long period gyroscopes, which of course are not affected by transitory forces or changes in position of the aircraft. In case, however, the aircraft is not flying exactly level, causing a slow ascent or descent, the short period pendulum 18 will detect the same and cause a slow shift in the relative position of the pick-offs 10, 10' at the gyro vertical so as to maintain level flight. Temporary movements of the pendulum 18 will have no effect unless repeated in the same direction, on account of the large reduction gearing connecting the turbine 37 and the control 10, 10', so that it is the average position of the pendulum which governs.

Similarly, the lateral stability is normally maintained by the gyro vertical. In this case the auxiliary pendulum 39 is only brought into operation when it is desired to turn with bank. The knob 42' is then turned over 90° to the right or left, in accordance with the direction of turn desired. This will both turn the plane through the operation of the turbine 53 and bank it properly through persistent deflection of the pendulum 39 controlling the turbine 40 due to a turn. When the turn is completed, the handle 42' is first brought back to the bank position, which results in the craft straightening out on its new course and the banking being gradually eliminated due to the fact that as centrifugal force is eliminated on the pendulum, it will hang vertical and cause actuation of the turbine 40 until the airplane is level. Then handle 42' is moved to the off position, which disengages the automatic banking control. The lateral or longitudinal positions of equilibrium may readily be changed by turning knobs 65 and 24.

It is interesting to note that the auxiliary pendulum 39 performs an important function in maintaining level flight immediately after a turn. At this time the gyro vertical I is usually, or may be, deflected from the vertical several degrees through the action of the lateral acceleration forces during the turn on the erection device, so that without the pendulum 39, the airplane would fly with one wing down until the gyro erected itself. The short period pendulum 39, however, immediately returns to the vertical after a turn, and through the ports 71, 71', the turbine 40 and the differential 38', the position of the pick-off ports 6 and 6' will be corrected so that the airplane will fly horizontal. As the gyro straightens up, the signal from the pendulum 39 decreases simultaneously, so that level flight is maintained. To secure this and other advantages, knob 42' may be left in the bank position instead of in the off position, if desired.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In an automatic stabilizer for airplanes, a gyro vertical, pick-off means governed by the relative position of said gyroscope and airplane about a transverse axis for positioning the elevator, a pendulum also pivoted about a transverse axis, and means responsive to the average position of the pendulum for slowly shifting the said pick-off means to change the relation between gyroscope and airplane.

2. In an automatic stabilizer for airplanes, a long period device for maintaining a horizontal reference plane, pick-off means actuated thereby for maintaining level flight, an auxiliary short period level device, and means for slowly modifying said first means from said level device to prevent descent or ascent of the craft due to shifts in the center of gravity thereof or the like.

3. In an automatic pilot for aircraft, the combination with directional and horizon gyroscopes, servo-motors and rudders, of control elements actuated by each and their respective servo-motors, means operable at will for shifting the relative position of said directional elements to cause turning, a pendulous device responsive to turn, normally inoperative means controlled therefrom for altering the relation between said horizon gyroscope and the craft to cause banking, and means brought into action by said first named means for rendering said second means operative.

4. In an automatic stabilizer for airplanes, a long period device for maintaining a horizontal reference plane, pick-off means actuated thereby for maintaining lateral equilibrium, an auxiliary short period level device, and means for modifying said first named means from said level device to cause automatic banking to the proper angle during turning and to assist in maintaining level flight after turns.

5. In an automatic stabilizer for airplanes, a gyro vertical, pick-off means governed by the relative position of said gyroscope and airplane about a fore and aft axis for positioning the ailerons, a pendulum also pivoted about a fore and aft axis, and means responsive to the average position of the pendulum for shifting the said pick-off means to change the relation between gyroscope and airplane to cause automatic banking at the proper angle.

6. In an automatic pilot for aircraft, the combination with a course maintaining means, a rudder control device actuated therefrom for steering any predetermined course, a horizon gyro and ailerons actuated therefrom, a servo-motor for slowly altering the relation between said means and rudder to cause turning as long as said motor runs, a second servo-motor for altering the relation between said horizon gyro and the ailerons, a normally inoperative level device for actuating the same, and a two-way valve adapted to be operated by the operator to cause said first motor to run in either direction and to render said level device operative to control said second motor to cause automatic banking.

7. An airplane automatic pilot as claimed in claim 3, having means for maintaining said banking means in operation after a turn is completed, to level the craft.

8. In a gyro pilot of the pneumatic type for dirigible craft, an enclosure for the gyroscope, a pair of air pick-off intake ports controlled thereby from which the operation of the rudder is controlled, means for continuously withdrawing air from said enclosure, a second pair of intake ports within said enclosure, a servo motor operated in one direction or the other from said ports for slowly changing the relation between the pilot and first named ports to cause turning of the craft as long as said motor runs, and remote valve means without said enclosure for differentially controlling the intake through said second named ports.

9. In a gyro pilot of the pneumatic type, for dirigible craft, an enclosure for the gyroscopes, a plurality of pairs of air pick-off intake ports controlled thereby from which the operation of the control surfaces is controlled, means for continuously withdrawing air from said enclosure, a plurality of pairs of opposing intake ports for altering the relation between the pilot and aircraft to change the course and attitude, servo motors operated in either direction from said second mentioned ports for slowly changing the relation between the pilot and the first named ports, and control valves without said enclosure for differentially admitting atmospheric air to one or the other of said second named pairs of ports to drive one or the other of said servo motors in either direction desired.

10. The combination of an automatic pilot for aircraft, including a directional gyroscope, a casing enclosing the same from which air is continuously exhausted, differential air ports adjustably mounted adjacent said gyroscope for maintaining a predetermined course, an air turbine connected thereto for altering the course steered by the gyroscope, and remote valve operated ports without said casing adapted to admit atmospheric air to one or the other side of said turbine to operate the same in either direction.

11. In an automatic pilot for aircraft, the combination with a course maintaining means, a rudder control device actuated therefrom for steering any predetermined course, a horizon gyro and ailerons actuated therefrom, a servo motor for slowly altering the relation between said means and rudder to cause turning as long as said motor runs, a second servo motor for altering the relation between said horizon gyro and the ailerons, a normally inoperative level device for actuating the same, means adapted to be operated by the operator to cause said first motor to run in either direction, and means for rendering said level device operative to control said second motor to cause automatic banking.

12. In an automatic stabilizer for airplanes, a long period device for maintaining a horizontal reference plane, pick-off means actuated thereby for maintaining lateral equilibrium, an auxiliary short period level device, a pick-off means thereat, a servo motor actuated by said last named pick-off means, for altering the relation between said long period device and said first named pick-off means, and manual means for altering the relation between said short period device and its pick-off means to cause turning of the craft by banking the same.

13. In an automatic pilot for aircraft, gyroscopic means for controlling the rudder, ailerons and elevator, and separate means for altering the relation between the respective gyroscopic means and aircraft to cause a change in the attitude of the plane, said means for governing the lateral attitude of the plane including an auxiliary transverse pendulum and means for altering the relation between the pendulum and craft, whereby correctly banked turns may be caused.

14. In an automatic stabilizer for airplanes, a gyroscopic pendulum for maintaining a horizontal reference plane, a servo motor for governing the ailerons, pick-off means at said gyroscope governing said servo motor, an auxiliary transversely pivoted pendulum, and pick-off means thereat which also affect the operation of said servo motor, said last named means prevailing upon persistent deflection of the pendulum due to turns.

15. In an automatic stabilizer for airplanes, a gyrovertical, pick-off means governed by the relative position of said gyroscope and airplane about a fore and aft axis for positioning the ailerons, a pendulum also pivoted about a fore and aft axis, means responsive to the average position of the pendulum for shifting the said pick-off means to change the relation between gyroscope and airplane to cause automatic banking at the proper angle, and means for rendering said pendulum responsive means operative and inoperative at will.

BERT G. CARLSON.